United States Patent [19]

Stemmle

[11] Patent Number: 4,708,468

[45] Date of Patent: Nov. 24, 1987

[54] SELF-ADJUSTING PAPER GUIDE

[75] Inventor: Denis J. Stemmle, Webster, N.Y.

[73] Assignee: Xerox Corporation, Stamford, Conn.

[21] Appl. No.: 925,865

[22] Filed: Oct. 30, 1986

Related U.S. Application Data

[62] Division of Ser. No. 814,827, Dec. 30, 1985, Pat. No. 4,660,963.

[51] Int. Cl.⁴ ........................ B65H 1/00; G03B 27/58

[52] U.S. Cl. ........................ 355/72; 271/144; 271/171; 355/3 SH

[58] Field of Search .................. 271/144, 171, 3.1, 10; 355/72, 3 SH, 14 SH

[56] References Cited

U.S. PATENT DOCUMENTS

| | | | |
|---|---|---|---|
| 3,227,444 | 1/1966 | Egan | 271/65 |
| 3,288,459 | 11/1966 | Hitchcock et al. | 271/10 |
| 3,402,628 | 9/1968 | Redding et al. | 83/434 |
| 3,615,129 | 10/1971 | Drawe et al. | 355/3 |
| 3,635,555 | 1/1972 | Kurahashi et al. | 355/8 |
| 3,640,524 | 2/1972 | Fredrickson | 271/36 |
| 3,672,765 | 6/1972 | Altmann | 355/24 |
| 3,702,697 | 11/1972 | Leutwein et al. | 271/3 |
| 3,856,295 | 12/1974 | Looney | 271/DIG. 9 |
| 3,862,802 | 1/1975 | Till | 355/23 |
| 3,869,202 | 3/1975 | Tabata et al. | 355/3 R |
| 3,920,238 | 11/1975 | Kitajima et al. | 271/9 |
| 3,987,465 | 10/1976 | Sippel | 354/83 |
| 3,999,852 | 12/1976 | Katayama et al. | 355/26 |
| 4,017,173 | 4/1977 | Komori et al. | 355/8 |
| 4,017,181 | 4/1977 | Komaba et al. | 355/72 |
| 4,035,073 | 7/1977 | DelVecchio | 355/24 |
| 4,052,054 | 10/1977 | Cardwell et al. | 271/227 |
| 4,053,152 | 11/1977 | Matsumoto | 271/9 |
| 4,066,252 | 1/1978 | Wick | 271/3 |
| 4,073,585 | 2/1978 | Kobayashi et al. | 355/14 |

(List continued on next page.)

FOREIGN PATENT DOCUMENTS

| | | |
|---|---|---|
| 3331077 | 3/1984 | Fed. Rep. of Germany . |
| 0123833 | 9/1980 | Japan . |
| 0052142 | 3/1983 | Japan . |
| 0036037 | 2/1984 | Japan . |

OTHER PUBLICATIONS

IBM Technical Disclosure Bulletin, vol. 18, No. 7, Dec. 1975, pp. 2057-2058, Colglazier et al.

IBM Technical Disclosure Bulletin, vol. 19, No. 9, Feb. 1977, p. 3290, Allen et al.

Xerox Disclosure Bulletin, vol. 1, Nos. 9/10, Sep./Oct. 1976, pp. 41-42, Collins.

Xerox Disclosure Journal, vol. 10, No. 3, May/Jun. 1985, pp. 147-148, Brown.

News Release from Canon, "A New Multi-Functional PPC 'Canon NP-3525' with Varied Features will be Launched", dated Nov. 18, 1985, Japan.

*Primary Examiner*—Richard A. Wintercorn

[57] ABSTRACT

An integral removable duplex module for use in conjunction with a reproduction processor is disclosed including two paper trays, a first operable as a duplex copy buffer tray or a paper tray and a second operable as an auxiliary paper tray, each tray having a copysheet feeder associated therewith comprised of a single cam operated mechanism having two cantilevered arms supporting constantly rotating feed rollers suspended above each paper tray and associated tray elevator mechanisms which enhances copysheet feeding when the feed rollers are pivoted toward the trays into copysheet feeding position and maintain copysheet trays in non-feeding positions during non-feeding operation. Copysheets are received in the duplex copy buffer tray from the reproduction processor via a reversible exit nip at the output of the processor, which directs sheets passed to an output back to a duplex module paper path, for repassing through the reproduction processor. Papers entering the module may be directed to either the duplex copy buffer tray or a trayless path which passes copysheets directly back to the processor. A method for operating the duplex module is described to efficient use of the trayless path, by directing copysheets thereto depending on the number of copies to be made. Accordingly, copysheets may be directable to the duplex tray or trayless path at various times during any run. Further use of the trayless path is made to advantageously improve two-up copying feature paper handling. Duplex operations are disabled on separation of the module from the reproduction processor.

3 Claims, 10 Drawing Figures

U.S. PATENT DOCUMENTS

| | | | |
|---|---|---|---|
| 4,098,551 | 7/1978 | Komori et al. | 355/3 R |
| 4,140,387 | 2/1979 | Gustafson | 355/14 |
| 4,158,500 | 6/1979 | DiFrancesco et al. | 355/14 |
| 4,164,649 | 8/1979 | Anderegg et al. | 235/480 |
| 4,218,128 | 8/1980 | Satomi et al. | 355/14 SH |
| 4,238,126 | 12/1980 | Langdon | 271/3.1 |
| 4,245,831 | 1/1981 | Michatek | 271/171 |
| 4,264,183 | 4/1981 | Stoudt | 355/3 R |
| 4,279,504 | 7/1981 | Brown et al. | 355/72 |
| 4,327,905 | 5/1982 | Schonfeld | 271/3.1 |
| 4,355,880 | 10/1982 | Stemmle | 355/3 SH |
| 4,365,794 | 12/1982 | Roller | 271/186 |
| 4,365,886 | 12/1982 | Murakami et al. | 355/3 SH |
| 4,385,825 | 5/1983 | Kaneko | 355/3 SH |
| 4,419,007 | 12/1983 | Kingsley | 355/14 SH |
| 4,433,836 | 2/1984 | Kulpa et al. | 271/3.1 |
| 4,451,138 | 5/1984 | Anderson | 355/14 SH |
| 4,453,819 | 6/1984 | Wada et al. | 355/3 SH |
| 4,466,733 | 8/1984 | Pels | 355/14 R |
| 4,468,114 | 8/1984 | Pels et al. | 355/14 R |
| 4,477,176 | 10/1984 | Russel | 355/3 TR |
| 4,486,012 | 12/1984 | Böck et al. | 271/3 |
| 4,487,506 | 12/1984 | Repp et al. | 355/14 SH |
| 4,536,078 | 8/1985 | Ziehm | 355/14 SH |
| 4,537,497 | 8/1985 | Masuda | 355/14 R |
| 4,561,772 | 12/1985 | Smith | 355/14 SH |
| 4,573,789 | 3/1986 | Wada | 355/14 SH |
| 4,575,227 | 3/1986 | Ito et al. | 355/56 |

SELF ADJUSTING PAPER GUID

This is a division of application Ser. No. 814,827, filed Dec. 30, 1985, now U.S. Pat. No. 4,660,963, issued Apr. 28, 1987.

This invention relates generally to reproduction machine paper handling and more specifically to a duplex module for use in conjunction with a reproduction machine.

INCORPORATION BY REFERENCE

For the purpose of background information, the following are incorporated herein by reference: for duplex copying background, U.S. Pat. Nos. 4,035,073 to Del Vecchio, 4,212,457 to Guenther and 4,468,114 to Pels et al.; for reversible roller background, U.S. Pat. No. 4,487,506 to Repp et al.; for information regarding trayless path duplex operation, U.S. Pat. No. 4,453,819 to Wada et al.; for reproduction machine or copier electonic controller background, and particularly operations including duplex mode, U.S. Pat. Nos. 4,475,156 to Federico et al. and 4,035,072 to Deetz et al.; and for copying of simplex documents laid simultaneously on a platen in a duplex format, U.S. Pat. Nos. 3,402,628 to Redding and 4,218,130 to Satomi.

BACKGROUND OF THE INVENTION

In increasingly complex reproduction or copier machines, customers demand an ever increasing amount of options, while at the same time demanding lower cost and greater reliability. This is particularly true in the low copy volume copier market, where most copiers are sold. Until recently, small size has been achieved by leaving out features commonly found in larger, more expensive machines. Now, customers regularly demand the same features in smaller sizes and at lower cost.

Of particular interest in smaller copiers is the provision of duplex copying. Duplex copying, i.e copying on both sides of a single sheet, presents significant problems in any copying machine since it entails the handling of paper which has already been processed and is less than perfect. Additionally, a large amount of work has been done in the area of providing a workable paper path for use in such machines. Further, it is desirable to make any operations in such copying machines as automatic as possible with a minimum of operator intervention. In small copiers these problems are increased since there is a limited amount of space for paper paths and a limited amount of automation possible due to the need for limitations in cost.

Not every consumer wished to pay for duplex operation. These products must appeal to the entire range of small copier purchasers, some of whom will prefer models that have fewer options at lower prices. At the same time, it would be highly desirable that a consumer could easily retrofit a flexible machine for duplex operation by providing the duplex operation as a simple add on component. In this manner, the consumer will not be required to purchase a new reproduction machine when he chooses to add duplex operation. Additionally, the duplex operation should bring added advantages to the consumer who, after all, will not use the duplex operation for every copy made. Accordingly, the add on duplex component should also be highly capable of operation in simplex mode.

In duplex machines heretofore known, dedicated duplex tray, has been required as part of the process of inverting documents for receiving an image on a second side of a copysheet. In such a machine, a copysheet having an image on one side is fed into the tray from the normal copysheet path and then refed back to the copysheet path. By converting the trailing edge of the copysheet to the leading edge of the copysheet, the copysheet is turned over in the normal paper path., and an image may be placed on the second side of the copysheet. It will be appreciated that an inverting tray takes up room in the machine that then cannot be used for other purposes. Further the process of depositing and then refeeding the sheet is one that is difficult to perform reliably in the degraded condition of the image bearing copysheet. Additionally, the refeeding mechanisms add expense and take up space in the machine.associated with the inverter tray.

In addition to duplex copying inversion, a non-inverting copysheet return pass is required if a two color copying or image merging capability is to be provided. In such an operation, a copysheet receives a first image, say, for example using black toner or inking material, and must be returned to the processor to receive a second image over the first image using a separate inking material, for example, red toner. Alternatively, a second image in any color, including black, may be merged onto a single side of a copysheet with a previously presented copysheet. This involves a copysheet handling operation similar to duplexing except that no inversion is required. It would be desirable to make use of existing copysheet paths or copysheet to accomplish color copying or image merging.

During duplex operation it is desirable to use a trayless path, i.e. a path which passes the copysheets bearing an image on a first side directly back to the reproduction processor to avoid the requirement of depositing the copysheets into a duplex tray for storage and subsequently refeeding them into the reproduction processor. A trayless path is preferred because stacking sheets in a duplex tray and subsèquently refeeding the sheets out from the tray takes time and reduces productivity. One alternative which would produce a satisfactory result would be the provision of a bottom feeder in the duplex tray. This solution is not economically attractive for lost cost copiers. While it is possible to use only the trayless path in certain short runs, e.g. a small number of copies per document, for greater numbers, the duplex tray is used exclusively. However, the requirements of small copier users are such that they generally do not use the duplex mode for particularly long runs, and it would be desirable to take advantage of the trayless path, with its improved productivity and reliability with respect to the duplex tray, as much as possible. Accordingly, an arrangement which uses a combination of the duplex tray and trayless path would be highly advantageous. Of course, the choice of paths must be automatic with the machine.

Additionally, the use of the trayless path enables the small copier to use certain copying schemes that are otherwise very expensive. including two up simplex document to duplex copysheet copying. For vacuum corrugating bottom feeders it is possible to feed out from the bottom and into the top of the duplex tray to gain a similar advantage, however, such feeders are very expensive. Particularly, copying processes which make the most efficient use of the reproduction processor possible require the fast return of copysheets for duplex copying, which is possible with the trayless path.

For duplex operation for documents presented in N-1 sequence, it is preferred that the machine controller knows the number of documents in a job to be run, or at least whether the number is odd or even. Otherwise, when the job is run for an odd number of pages to be copied, the last odd page, which is the first document to be scanned, will appear on the reverse of the last copysheet as opposed to being copies simplex, as should occur. If this happens, the copy of the first document page which was the last copied, will not have an image on its reverse side as normally desired by an operator. Larger machines may be provided with recirculating document handlers which can count the documents without running the processor, and return the documents to the input position with the number of documents known and ready to start the copying job. However, recirculating document handlers are usually very expensive, and are not economically attractive for use on smaller copiers at the present time. Accordingly, it would be desirable for a document feeder normally used with such copiers to accommodate a counting function, and advise the machine operator to return the counted documents to the input side of the feeder. It would also be desirable if the operator who knows the number of documents in the job could enter the number to the controller to avoid the time consuming count.

As noted it is desirable for the components needed for the duplex function of a machine to serve in other capacities in addition to the duplex mode. Accordingly, a duplex tray should also be useful for holding a supply of paper for first side copying, and using the duplex copysheet handling devices to pass blank copysheets to the reproduction processor. For use of the duplex tray in this mode, it is desirable that the presence of paper in the duplex tray be detected, its size sensed, and the information be transmitted to the operator via a display on the control panel. For duplex operations, it would be desirable to sense the presence of copysheets, and register the copysheets in a known position as they are passed to the duplex tray. Additionally, as no paper should be in the duplex tray prior to duplex operations, it would be desirable for a paper detection operation to be performed at this time.

A module as contemplated will be provided with a sliding drawer holding the duplex tray. This is contemplated since it requires a minimum amount of room in an arrangement with the reproduction processor. Accordingly, the tray must be provided with paper guides to support paper held therein against movement when the drawer is closed. It would also be desirable that the paper guides provided be as easily adjustable for the operator as possible to accommodate a number of different paper sizes during the paper supply operations, as well as support copysheets received in the duplex tray during duplex operation. Thus, paper guides in the present invention should not require operator adjustment when changing among different sizes of standard paper in either mode of operation. Additionally, operator access to the copysheet paths contained in the module for jam clearance and servicing, should be provided, small size of the module not withstanding.

For small copier products it is desirable that the drivers of any of the functions of the machine must perform multiple functions. Thus for example, a single motor could drive the copysheet tray feeder, duplex tray feeder, switch cans, enable deflectors, etc. The problem is compounded when it is realized that many of these functions must be isolated from one another, i.e., the separate functions must not be allowed to operate simultaneously.

SUMMARY OF THE INVENTION

In accordance with the above, it is the outstanding object of the present invention to provide an improved copier and complementary duplex module.

It is another object of the present invention to provide a copier comprised of components that have a high degree of commonality of usefulness in multiple modes of copying operations.

It is still a further object of the present invention to provide a copier suitable for use in a duplex operation without requiring an duplex buffer tray.

Another object of the invention is the provision of a method for operating a copier to gain the maxiumum usefulness from a trayless duplex paper path before resorting to a duplex buffer tray.

Yet another object of the invention is the provision of an improved copysheet feeder for feeding paper or copysheets from a duplex tray to a reproduction processor.

In accordance with the objects of the present invention, there is provided a reproduction machine for copying documents in both duplex and simplex fashion, including an xerographic reproduction processor for producing an image of a document on a predetermined side of a copysheet; a paper tray for storing a supply of paper; a copysheet path for carrying paper from a paper supply tray through the processor to an exit means for moving copysheets to an output; a removable duplex module for close association with the processor, including a receiving opening for receiving said copysheets from said exit means; a duplex path for carrying copysheets from the processor exit back to the paper path to be represented to the processor to receive a second image thereon, and including a duplex tray for receiving copysheets for storage prior to returning said copysheets to said paper path means; and a trayless paper path for passing copysheets directly from said exit means to said paper path means.

In accordance with another aspect of the present invention, there is also provided an exit nip near the output of the reproduction processor which is selectably drivable for either of forward, reverse or stop motion of said copy sheet. In operation, a reversible motor provides the forward driving motion of the exit nip rollers to drive copysheets therethrough to an output, the reverse driving motion of the exit nip rollers carrying the copy sheets to a duplex copysheet path for representing copysheets to the processor; and stop motion to hold the copysheets at the exit nip rollers. The process of reversing the driving motion of the exit nip rollers converts the trailing edge of the copysheet to the leading edge which, when directed to an appropriate paper path thereby inverts the sheet for receiving a second side image thereon. In stop motion, the copysheet is held until a control singal selects one of the driving directions.

In accordance with yet another aspect of the present invention, there is provided a reproduction machine including a document feeder, provided with alternative means for entering information regarding the number of documents to be copied, desirable for correct duplex operation, to obtain collated copy sets using N-1 sequencing of originals into a machine controller, including direct operator entry if the operator knows the information; and a default information entry method when no information is provided, whereby the documents are passed through a document feeder without copying to derive a document count, and the machine operator is advised to replace the documents at the document input.

In accordance with still another object of the present invention, a duplex buffer tray is provided with a tamper arm for registering, detecting size, and detecting the absence of paper in the tray.

In accordance with another aspect of the invention, the duplex buffer tray may be provided with disappearing paper guides which are compliant in the vertical direction, and rigid in the lateral direction, whereby paper larger the a preselected size to be supported by the paper guides biases the guides out of position, while paper of the selected size is held in lateral position against movement thereof.

In accordance with yet another aspcet of the invention, the paper trays in the duplex module are provided with a feeder, for feeding copysheets or paper held in the trays to a return path to the reproduction processor. The inventive feeder may be comprised of two parallel spaced feeder arms cantilevered over the trays, and mounted for pivoting movement about a fixed axis on the duplex module frame between neutral and copysheet feeding positions. The feed arms support feed rollers for constant rotational paper feeing motion. When paper feeding is desired, a cam rotates the feeder arms and rollers into copysheet feeding position against a retard pad in each the paper trays.

In accordance with yet another aspect of the invention, there is described a method of operation of the reproduction machine as described which entail passing copysheets to receive second images thereon to one of the duplex tray and the paper path in response to the number of copies remaining to be made. Alternatively, copysheets to receive second side copies thereon are passed to the trayless path and held therein while a second image is presented for copying.

In accordance with still another aspect of the invention, means are provided in the copysheet path between the reproduction processor and the reversible exit means for by passing the exit means reversal of the copysheet, whereby copysheets are passed to through the duplex module and not inverted. In this fashion, the copysheets are represented to the reproduction processor to receive a second image overlayed on the first for image merging or color copying.

The invention may take physical form in certain parts and arrangements of parts, a preferred embodiment of which will be described in detail in this specification and illustrated in the accompanying drawings which form a part hereof and wherein.

Figure 3A:
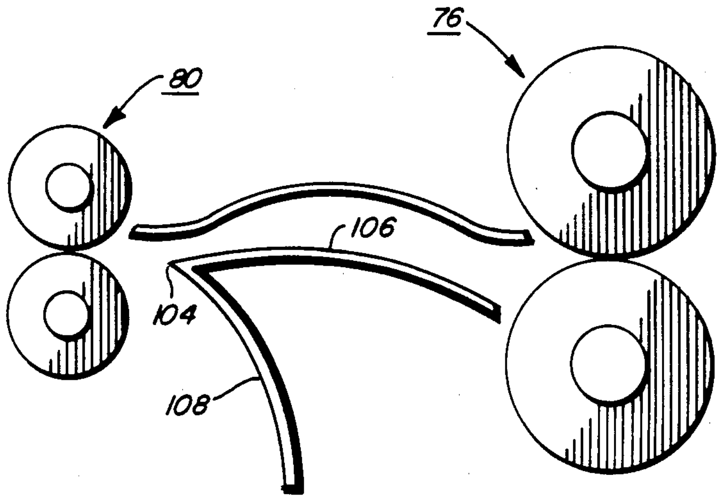
Figure 3B:
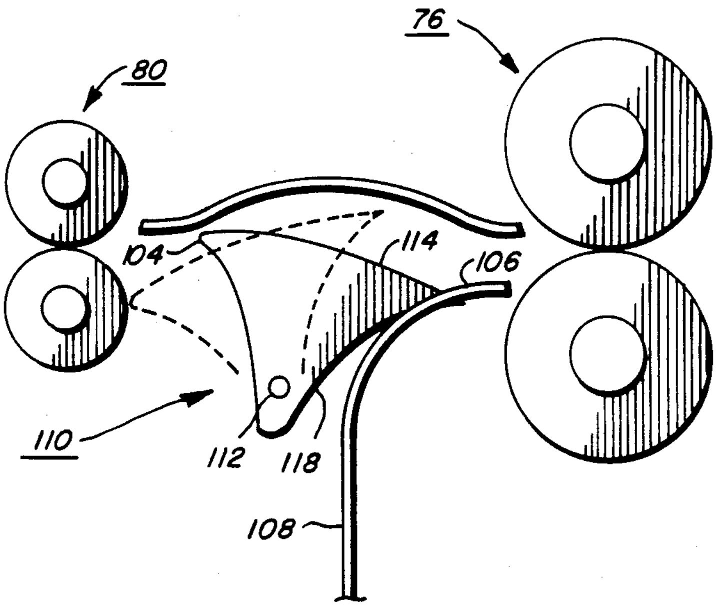
Figure 4:
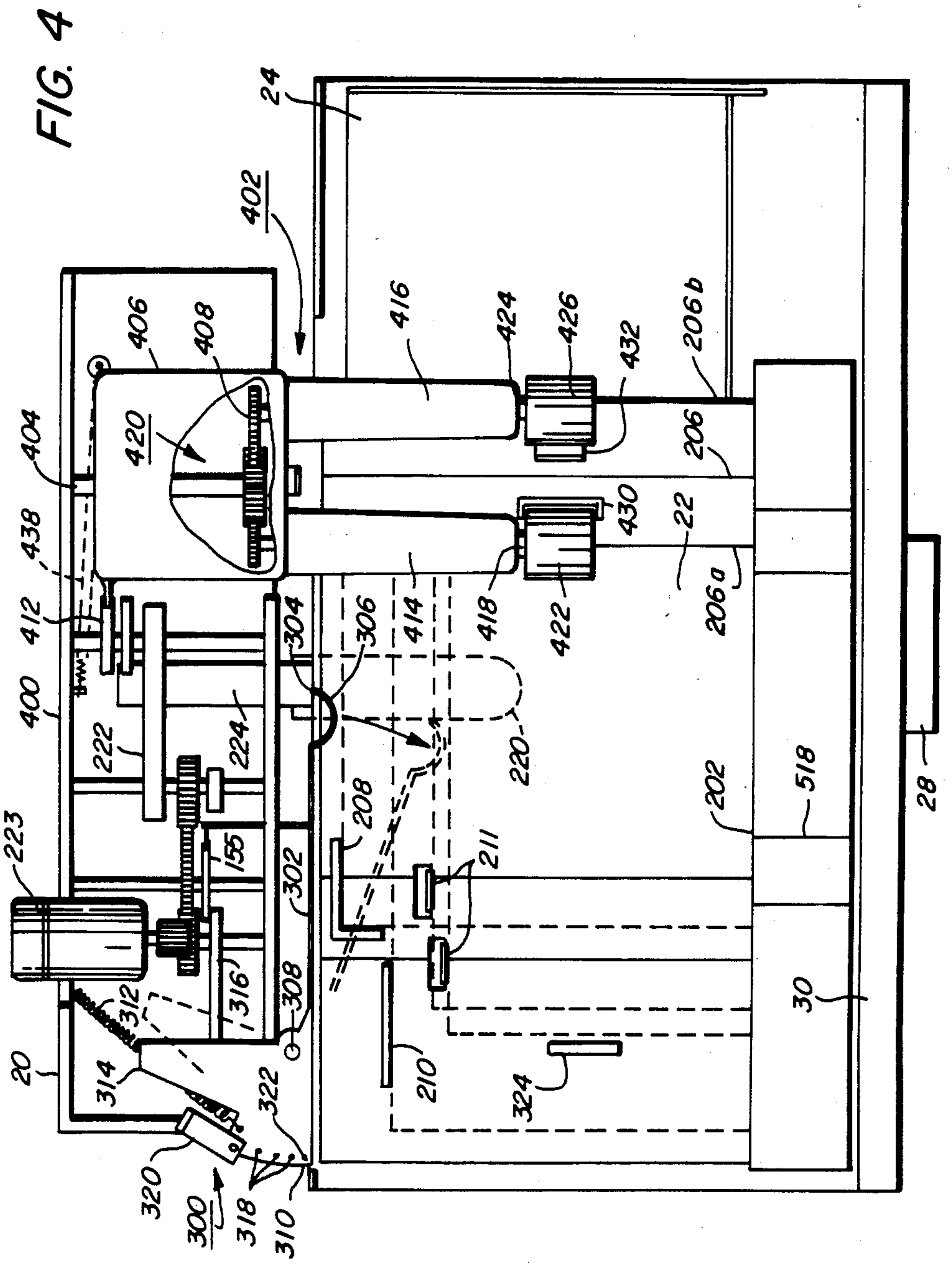
Figure 4A:
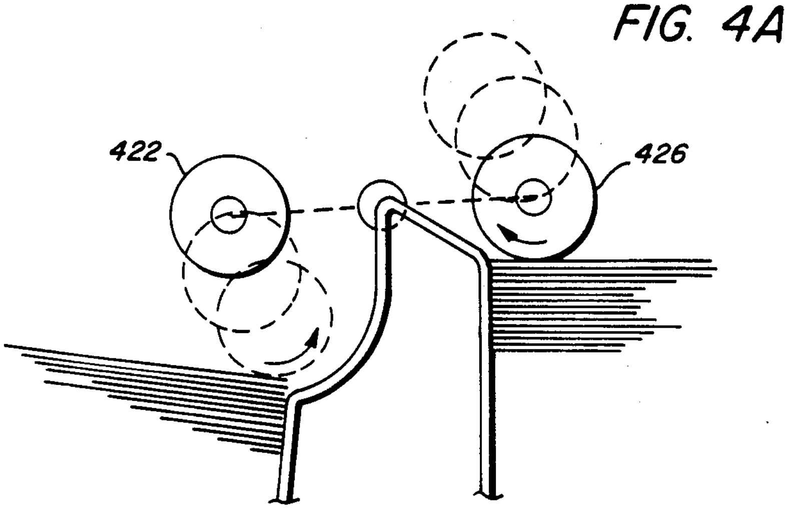
Figure 5:
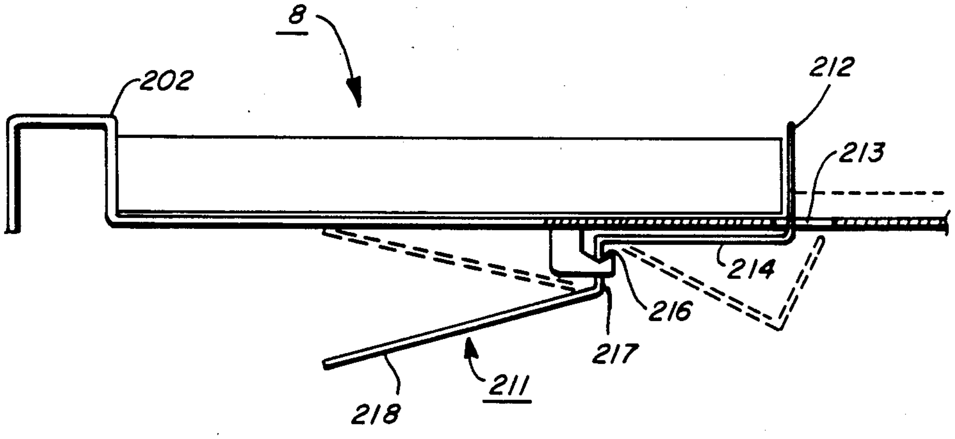
Figure 6:
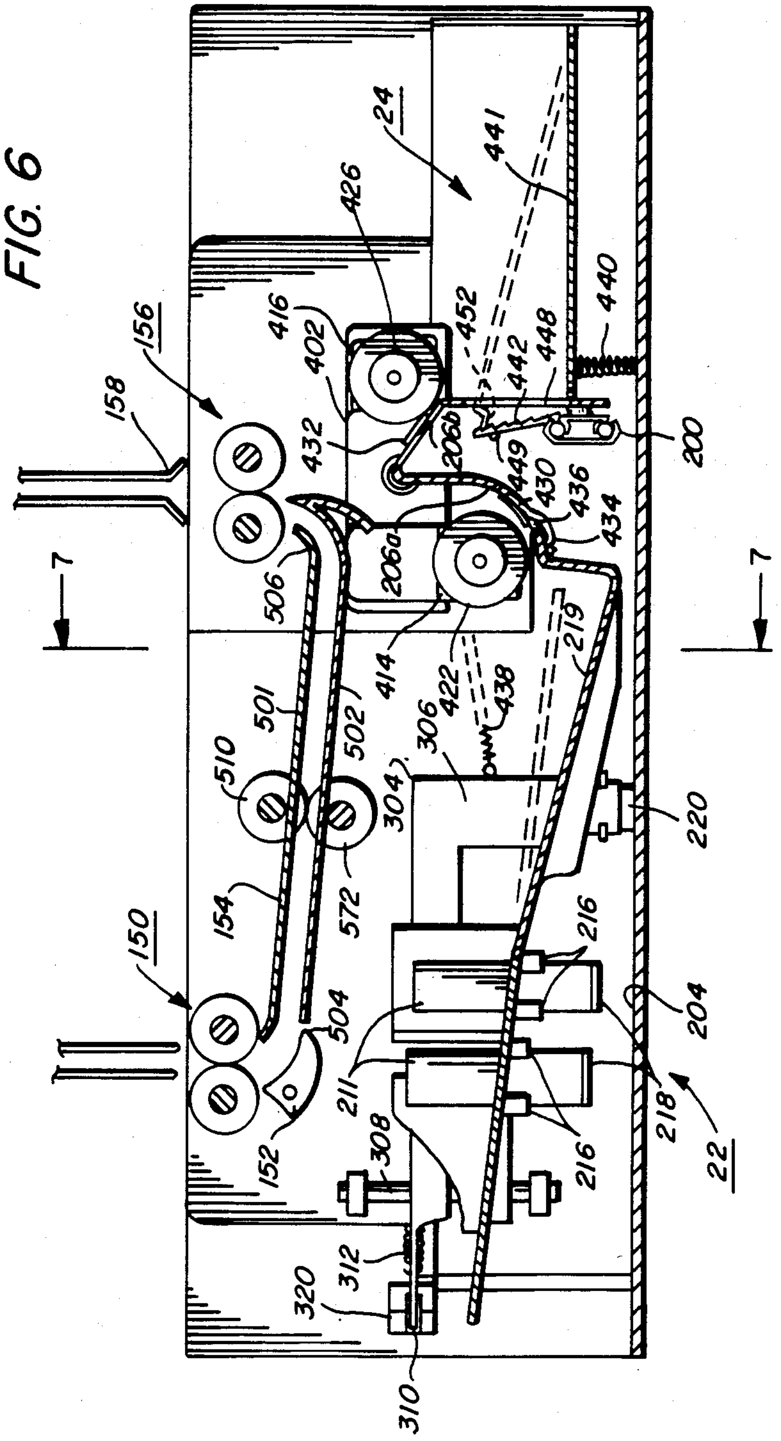
Figure 7:
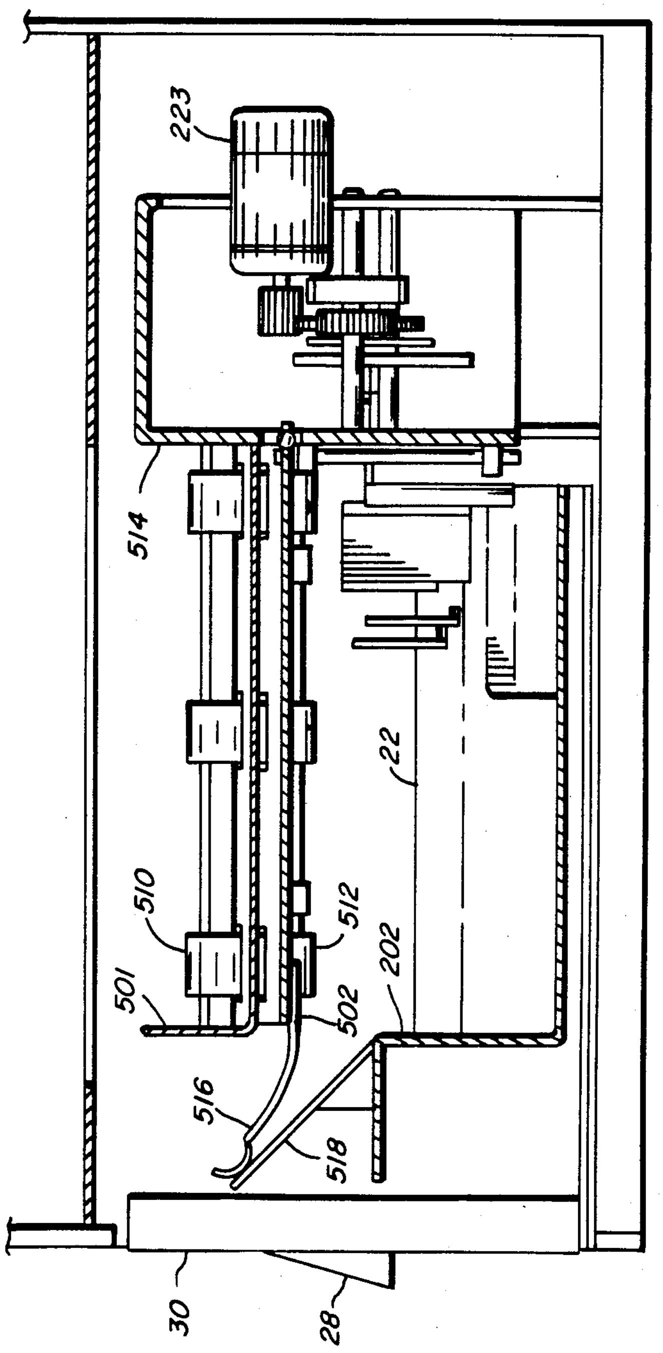
Figure 8:
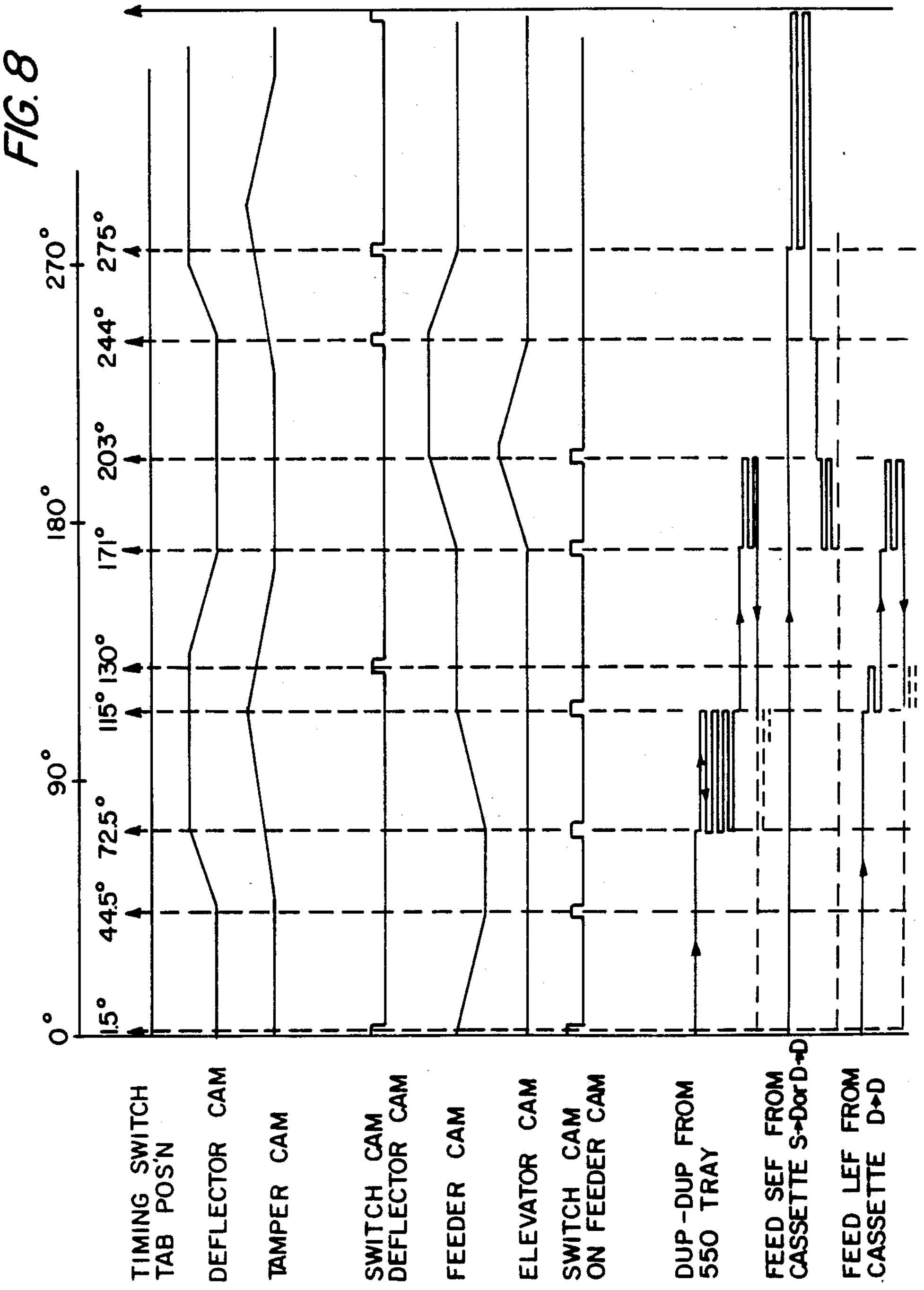

FIG. 3*a* shows the intersection in the reproduction processor where copysheets from the reproduction machine is reversed to the duplex module paper path, while FIG. 3*b* shows the same intersection including a deflector for second pass color copying;

FIG. 4 shows a plan view of the duplex module according to a preferred embodiment of the invention;

FIG. 4A shows a somewhat schematic view of the rotational motion of the feeder assembly with respect to the copysheet trays-in accordance with a preferred embodiment FIG. 5 shows a partial side sectional view of the duplex module demonstrating operation of disappearing side guides forming a part of the invention;

FIG. 6 shows a front sectional view of the paper path and operating components of the duplex module;

FIG. 7 shows a side sectional view demonstrating the arrangement of the trayless path in the duplex module; and FIG. 8 shows a chart of the operating sequences of the cams driving the various components of the present invention.

Figure 1:
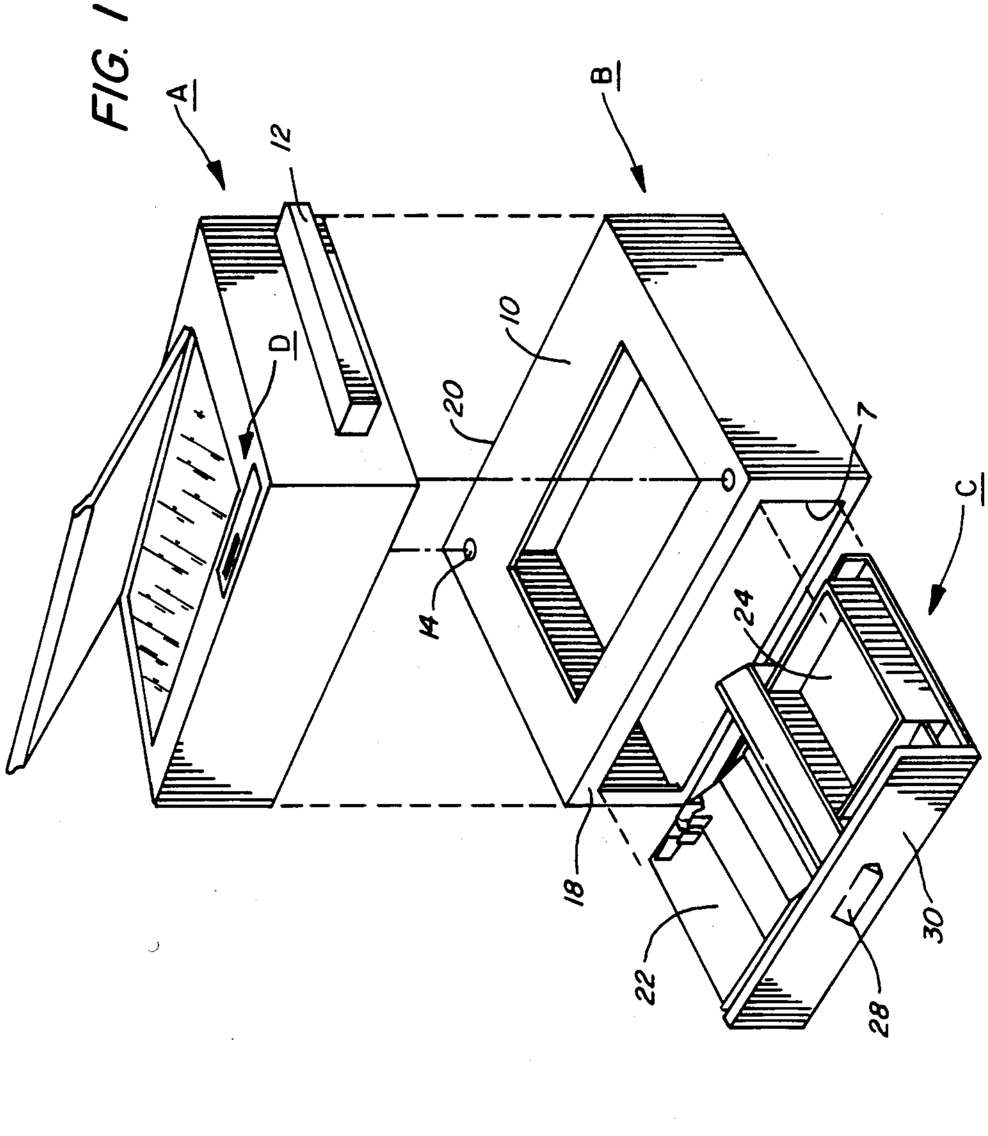
FIG. 1 shows a perspective view of a preferred embodiment of the invention in combination with a standard reproduction processor.

Referring now to the drawings where the showings are for the purpose of describing a preferred embodiment of the invention and not for the purpose of limiting same, FIG. 1 shows the combination of a reproduction processor and an duplex module arranged for post collation document handling as contemplated by the present invention. Generally, reproduction processor A, provided with paper supply tray 12, is seated securely on a top 10 of duplex module B generally by placing protuberances on the bottom of the reproduction processor (not shown) in docking dimples 14 in top 10 of duplex module B. As can be seen, duplex module B is provided with an opening 16 through which copysheets from the reproduction processor A will be received and returned thereto. Duplex tray drawer C is slidable into and out of an opening 17 in front side 18 of the duplex module frame 20, and provides a support platform for duplex buffer tray 22 and auxiliary paper tray 24 as will be described in more detail hereinafter. Drawer C is provided with drawer handle 28 in drawer front side 30 for operator movement of drawer C. Various conditions are reported to the operator at an alphanumeric display 31, which also provides a control panel for selectable control of the operation of the combination of the processor A and module B as will be more fully described hereinbelow. The protuberances and docking dimples may also include electrical power connections as well as sensor, switch or control connections connecting the reproduction controller with the duplex module in controlled operating relationship.

Figure 2:
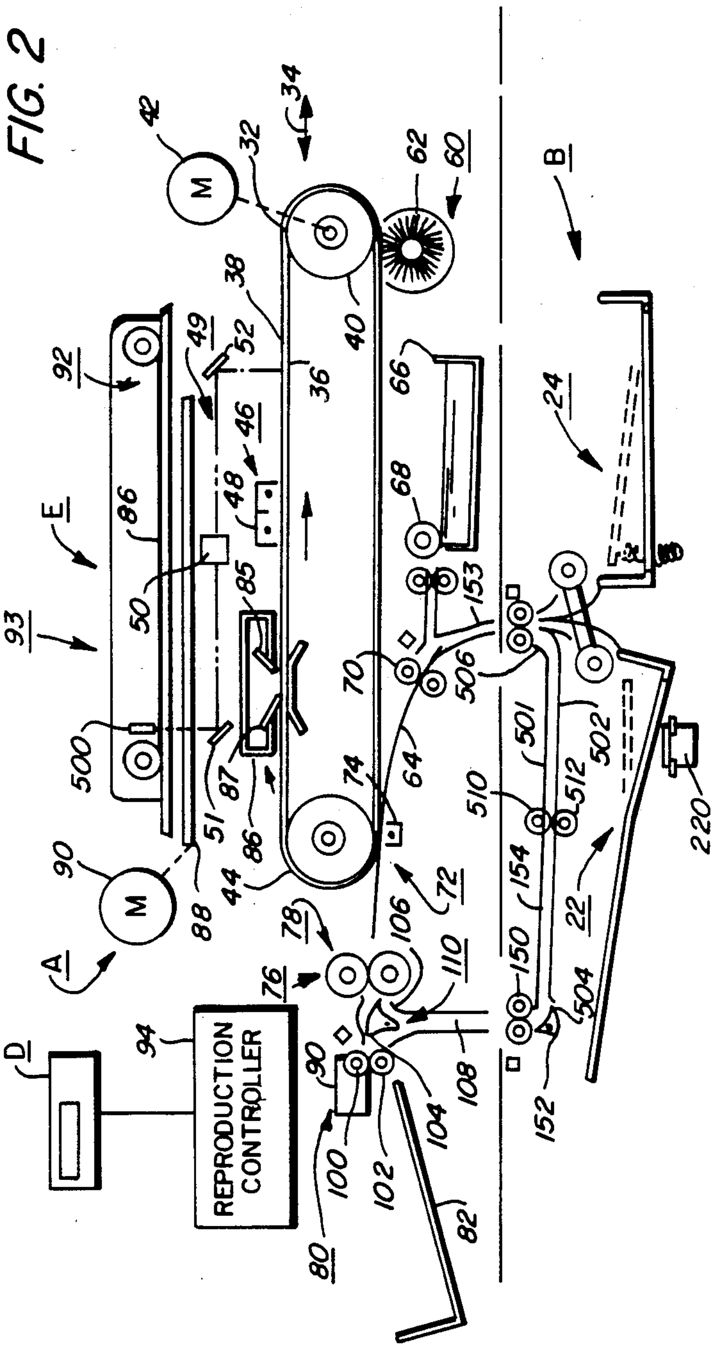
FIG. 2 shows a somewhat schematic view of the copysheet path as it carries paper through the processing stations of a reproduction machine and the inventive duplex module.

FIG. 2 shows the paper and copysheet paths and operational stations of a somewhat standard reproduction machine in conjunction with the inventive duplex module B paper paths, and adapted particularly to the need of a small copier. By way of example, reproduction processor A is comprised of an automatic xerographic reproducing machine which includes a removable processing cartridge. The reproducing machine depicted in FIG. 2 illustrates the various components utilized therein for producing copies from an original document. It should become evident from the following description that the invention described herein is equally well suited for use in a wide variety of processing systems including other reproduction systems, and is not necessarily limited in application to the particular embodiment or embodiments shown herein.

The reproduction processor A illustrated in FIG. 2 employs a removable processing cartridge 32 which may be inserted and withdrawn from the main machine frame in the direction of arrow 34. Cartridge 32 includes a belt like photoreceptor member 36, the outer periphery of which is coated with a suitable photoconductive material. The belt is suitably mounted for revolution within the cartridge about driven transport rolls 40 and 44, and travels in the direction indicated by the arrows on the inner run of the belts to bring the image bearing surface thereon past the plurality of conventional xerographic processing stations. Suitable drive means such as motor 42 are provided to power and coordinate the motion of the various cooperating machine components whereby a faithful reproduction of the original input image information is recorded upon a copysheet 64, such as a paper or the like.

Initially, photoreceptor 36 is passed through a charging station 46 wherein photoreceptor 36 is uniformly charged with an electrostatic charge placed on the photoconductive surface by charge corotron 48 in a known manner preparatory to imaging. Thereafter photoreceptor 36 exposed to the light from the input image whereby the charge is selectively dissipated in the light exposed regions to record the input image in the form of electrostatic latent image. The document is scanned with a multi mirror scanning optics system 49 including stationary lens 50 and a pair of cooperating movable scanning mirrors. The scanning mirrors include a half rate mirror 52 and a full rate mirror 51 supported on carriages (not shown) for scanning movement. Multi mirror scanning system 49 is of a type well known in the art. A suitable development station could include a magnetic brush development system, including developer roll 62, utilizing a magnetizable developer mix having course magnetic carrier granules and toner colorant particles. In some embodiments of the invention, the operator may be provided with means to select among a choice of colored toners to apply images onto copysheets in different colors.

Paper sheets 64 are supported in a stacked arrangement on elevated stack support tray 66. With the stack at its elevated position, the sheet separator segmented feed roll 68 feeds individual sheets therefrom to the registration pinch roll pair 70. The sheet is then forwarded to the transfer station 72 in proper registration with the image on the belt, and the developed image on the photoconductive surface 38 is brought into contact with copysheet 64 within the transfer station 72, and the toner image is transferred from the photoconductive surface 38 to the contacting side of the copysheet 64 by means of transfer corotron 74. Following transfer of the image, the copysheet, which may be paper, plastic, etc., as desired, is separated from photoreceptor 36 by the beam strength of copysheet 64 as it passes around the curved face of photoreceptor 36 around the transport roller 44; and the copysheet containing the toner image thereon is advanced to fixing station 76 wherein the transferred powder image is affixed to the copysheet. After fusing the toner image to the copysheet, copysheet 64 is advanced to the reversible exit nip 80 from where it may be directed to sheet stacking tray 82 or to the input of a sorter, or directed to duplex module B.

Although a preponderance of toner is transferred to the copysheet 64, invariably some residual toner remains on the photoconductive surface 38 after the transfer of the toner image to the final support material or copysheet. The residual toner particles remaining on the photoconductive surface after the transfer operation are removed from the belt 36 by the cleaning station 84 which comprises a cleaning blade 85 in scrapping contact with the outer periphery of the belt 36, and contained within cleaning housing 86 which has a cleaning seal 87 associated with the upstream opening of the cleaning housing. Alternatively, the toner particles may be mechanically cleaned from the photoconductive surface by a cleaning brush as is well known in the art.

When the copier is operated in the conventional mode, original document D to be reproduced is placed on platen 88 which is scanned by multi mirror scanning optics 49 which directs light from the document to the photoreceptor 36 for copying. The speed of photoreceptor 36 and scanning optics 49 are synchronized to provide for accurate reproduction of the document. Platen 88 is preferably large enough to support at least two $8\frac{1}{2}\times 11$ inch documents disposed on the platen with their long edges adjacent in side-by-side relationship, perpendicular to the plane of drawing of FIG. 2. Servo motor 56 drives scanning optics 49 in its motion by platen 88 and is controllable by the reproduction processor controller 94 to selectively scan platen 88, whereby only a portion or a selected document on the platen is copied. Additionally, while in normal copying operation the scanning optics are moved along a path from a home position to a position required to complete exposure of a document to be copied, servo motor 56 is also controllable to provide repeated copying of such document, and returning scanning optics 49 to a "start scanning" position other than a normal home position for such copying.

Reproduction processor controller 94 is preferably a known programmable controller or combination of controllers, which conventionally controls all of the other machine steps and functions described herein and including the operation of the document feeder, the paper path drives in both the reproduction processor A and duplex module B etc. As further described herein, the controller 94 also conventionally provides for storage and comparisons of counted values including copysheets and documents, and numbers of desired copies, and control of operations selected by an operator through alphanumeric display and control D.

Automatic document feeder E is optionally provided to take advantage of certain features obtainable by the use of the inventive duplex module B. In the present embodiment, the automatic document feeder is somewhat standard, and is controllable by the reproduction processor controller 94. Documents are fed into the device at document input 92, and are passed across platen 88 for copying, and exit the feeder at document output tray 93.

It is believed that the foregoing general description is sufficient for the purposes of the present application to illustrate the general operation of an automatic xerographic copier which can embody the apparatus in accordance with the present invention. It will be appreciated that while the present invention finds particularly advantageous use with respect to the described arrangement, the principles of operation may be used in many other embodiments.

In accordance with one aspect of the present invention, reversible exit nip 80 is provided with motor 98 for driving drive roller 100 in forward, reverse and stop motion. Motor 98 may advantageously be a stepper motor of the sort well known in the art. Reproduction processor controller 94 instructs motor 98 to drive the drive roller 100 of the exit nip 80 as required by the copying function in process. Thus, for simplex copying of a document, or completed duplex copying of a document, roller 100 is driven in a forward direction to drive copysheet to output tray 82 thereby serving as an output driver. In the case where the copysheet is required to receive a second side image for a duplex copy, roller 100 is driven first in a forward direction until the copysheet trail edge has cleared passive deflector 104, and subsequently in reverse direction to drive the copysheet back into reproduction processor A to be directed to the duplex module B. The process of changing direction while the copysheet is in exit nip 80 serves to change the trail edge of the copysheet to the lead edge to enable inversion of the document to receive a second side copy. In certain cases, it will be desired to hold a copysheet while the processor advances previously returned copysheets in order to correctly time the return of all the copysheets to processor A for receiving a second image. In this case, roller 100 is stopped and the copysheet is held between the rollers until a control signal is received from controller 94 by the motor 90, directing it to drive the paper in either forward or reverse motion.

In operation, reversible exit nip 80 receives the copysheet between rollers 100 and 102 comprising the exit nip from fuser station 76. The copysheet is passed therebetween until the trailer edge clears the passive deflector 104 of the copysheet path 106 from the fuser 76 and the duplex module copysheet path 108. As more clearly seen in FIG. 3 passive deflector 104 is situated slightly higher than reversible exit nip, and extends into the paper path 106 to block the returning copysheets and direct them to the duplex path 108.

Passive deflector 104 may advantageously be provided on toggling image merging path selector 110, best shown and compared to a standard passive deflector 104 in FIGS. 3 and 3A. In this case, selector 110 is comprised of a generally triangular member having an upper convex surface 114 forming the end portion of copysheet path 106 from the fuser 76 to passive deflector 104 in normal copying processes; and providing concave surface 116, facing the reversible exit nip 80, to define the uppermost portion of duplex module copysheet path 108. When image merging copying is desired, reversal of the copysheet lead and trail edges is not required, and the image merging path selector 110 is pivoted about axis 112 (as shown in phantom in FIG. 3A) closing access to passive deflector 104 to keep copysheets entering from reversible exit nip 80, and create a path formed by concave surface 118 and leading directly from copysheet path 106 to duplex module copysheet path 108. Copysheets passed through the duplex module B in this manner are returned to the reproduction processor A presenting the same side for copying as was presented the first time through. Thus, either a new image of colored image may be overlayed thereon.

As seen in FIG. 2, copysheets to receive a second image thereon are passed downwardly from the passive deflector 104 along duplex module copysheet path 108. For the purpose of description, these sheets will be assumed to be receiving an image on the second side thereof, and will be described as such, although it will be appreciated that such sheets could be receiving an second image overlayed on the first side image. Where appropriate, the image merging process will be mentioned with particularity.

Copysheets are passed from the reversible exit nip 80 past the passive deflector 104 via duplex paper path 108 to duplex module entry nips 150 which pass the copysheet into the duplex module B. On passing duplex module entry nips 150, sheets are passed to duplex deflector baffle 152. Duplex deflector baffle 152 serves to direct copysheets to either trayless path 154 or duplex tray 22. Deflector baffle 152 is driven by a deflector cam 155, best viewed in FIG. 4, and is controllable in response to reproduction processor controller 94, in accordance with the copying functions the operator has selected. When duplex deflector baffle 152 is in place to block entry of copysheets into the trayless path 154, such copysheets are directed into duplex tray 22. Copysheets which are passed to duplex tray 22 are refed therefrom to reproduction processor duplex entry path 158 through duplex module exit nip 156 to re-enter the reproduction processor module A for receiving a second side copy.

As shown best in FIGS. 1, 4 and 6, duplex module B is comprised generally of frame portion 20 and a drawer C mounted for slidable movement through opening 17 in front side 18 of duplex module B. Drawer C is mounted for slidable movement into and out of module frame 20 on drawer slide 200. The front side 30 of drawer C is provided with handle 28 on the exterior thereof to allow an operator to grip drawer C for sliding movement thereof. On the interior of the front side 30 is a fixed abutment member 202 forming a fixed copysheet front side guide. Mounted in side-by-side relationship on the support surface 204 of the sliding drawer C are duplex tray 22 and auxiliary tray 24. Separating the trays is a fixed copysheet transporting guide 206 provided with generally concave copysheet feeding surfaces 206*a* and 206*b* leading from the duplex tray 22 and auxiliary tray 24, respectively.

Duplex tray 22 and its paper supporting surface, elevator 219, is particularly adaptable for receiving a wide variety of paper sheet sizes in its use as a duplex buffer and as an auxiliary paper tray. In accordance with one aspect of the present invention, to provide support for paper held in the tray against lateral motion particularly caused by the movement of the sliding drawer in its opening and closing, for registration of paper deposited in the tray, and to accommodate a wide variety of paper sizes, the elevator 219 is provided with a combination of fixed paper guides and disappearing paper guides. Best shown in FIG. 4, the elevator 219 is provided with fixed rear side guide members which are placed in position with respect to the front side abutment 202 to support against lateral movement of copysheets in duplex tray 22 copysheets of the widest anticipated size. Thus, for example purposes only, a fixed corner abutment 208 is provided to support $8\frac{1}{2}\times 11$ inch paper to be fed to the reproduction processor long edge first. Similarly, a rear side guide 210 is provided to support $8\frac{1}{2}$ inch paper widths which are to be fed to the reproduction processor short edge first. Side guides 208, 210 are well known in the art of paper handling, and extend vertically upward from the surface of the duplex tray a height sufficient to support a selected amount of paper. In combination with the fixed guides, unidirectionally biasable guide member 211 may be provided to support paper with dimension less than that supportable by fixed abutments 208, 210. Unidirectionally biasable guide member 211 disappears in response to the deposit of paper on the elevator 219 which is larger than tha paper size that the particular guide is adapted to support. In practice, the unidirectionally biasable guide members may be provided as shown in FIG. 5, wherein the guide member 211 is comprised of a guide 212 which extends perpendicularly through a slot opening 213 elevator 219 surface, and is supported on a lever arm 214 supported for pivotal movement on a knife edge pivot 216 formed in the lever arm 214, and mounted for pivoting movement in pivot mount 217. Counterbalance arm 218 extends outwardly from pivot 216 in the opposite direction from lever arm 214. Counterbalance arm 218 serves to bias the lever 214 normally upwardly to provide the guide in position above the elevator 219 surface. When a copysheet deposited in the tray has a size dimension greater than that intended to be laterally supported by guide 211, the paper biases the guide 212 through slot opening 213 to a position below the tray surface. Of course, it will be appreciated that the described embodiment of the disappearing guide member 211 is only a preferred embodiment. By way of example, guide 212 could easily be supported on a spring for biased movement through slot opening 213, or arranged for pivoting movement on a journal bearing with a spring biasing the guide 212 from a horizontal to a vertical position. The unidirectionally biasable guide members are complaint, but laterally rigid. Therefore, while the guides a vertically moveable to a non guiding position, the arrangement of the narrow slot and the guide member provides a member fixed against lateral movement.

Paper supporting elevator 219 is provided in duplex tray 22 supported for pivoting movement in the vertical direction with respect to drawer support surface 204 of drawer C. When documents are fed to elevator 219 or added to the tray for auxiliary paper tray operation, the elevator 219 is lowered to assist in advancing the copysheets to the most forward point in the tray for registration against the forward most wall in the tray. For feeding copysheets out of the tray, a leaf spring 220, located between the elevator 219 and drawer support surface 204, biases the elevator 219 upwardly. Rotation of elevator cam member 222 by duplex motor 223 raises the tray when required by forcing downwardly on a section of the spring behind knife edge pivot 224 thereby lifting the portion of the spring underneath the tray. Leaf spring 220 is supported for pivoting movement at a pivot point between the leaf spring 220 and tab 224 so that release of the bias on tab 224 by elevator cam 222 lowers leaf spring 220 and elevator 219. Additionally, as the leaf spring 222 is mounted on the drawer C while elevator cam 222 is located on frame 20, movement of the drawer C outwardly from the frame 20 release the bias on tab 224. It will no doubt be appreciated as well as that the elevator 219 is lowered when the drawer C is pulled outwardly, since outward movement of the drawer C disengages leaf spring 220 from cam 222 to release the biasing force on the elevator plate thereby facilitating loading of paper into the tray 22.

In accordance with another aspect of the invention, there is provided, mounted on the duplex module frame 20, an improved paper registration means and size sensing means for registering copysheets received in elevator 219 laterally against abutment 202 and detecting the size thereof. As shown best in FIG. 4, tamper assembly 300 is provided with an elongated arm 302 including a first tamper end 304 comprised of a arcuate section 306 having a height extending from the tray surface about equal to the height of a stack of copysheets which could be held in duplex tray 22. Arcuate section 306 is pushed against paper deposited in tray 22, and is curved so as to always provide a distributed normal force against the copysheets. The tamper assembly 300 is mounted for pivotal movement about a pivot shaft 308 which is, in turn, mounted on duplex module frame 20. Tamper assembly 300 has a sector member 310 extending outwardly from pivot shaft 308 in a generally opposite direction from elongated arm 302. Biasing means are provided to bias the tamper arm 302 towards abutment 202, such as by spring member 312 which may advantageously be applied by connecting a first end of spring member 312 to a biasing arm 314 extending from tamper assembly 300 on the same side of pivot shaft 308 as the sector member 310, and connecting a second end of spring member 306 to frame 20. The biasing force of spring member 312 is sufficient to provide force to move the tamper arm 302 and a copysheet until the copysheet is abutting the abutment 202. In the absence of paper in the tray, the tamper arm 302 is biased to a position spaced from the abutment a distance less than the narrowest width of standard paper to be detected. During paper feeding operations, the tamper arm 302 is cleared from the tray area by a tamper cam 316, which moves or rotates biasing arm 314 in a direction opposite that of spring 306 to move the arm out of the duplex tray area. Tamper cam 316 is driven by duplex motor 223. Since it is mounted on frame 20 instead of drawer C, the tamper arrangement remains within the frame 20 when the drawer C is pulled outwardly therefrom, thus clearing the tamper arrangement from the paper trays for paper loading or unloading operations.

Sector member 310 is provided with a series of bumps comprising raised areas 318 distributed around its circumference, and corresponding to positions of tamper arm 302 when it is pushing paper sheets of various sizes into position against abutment 202. Bumps 318 actuate switch 320, which is mounted in position on frame 20 above the sector 310 for actuation by the bumps. While sector member 310 is moving in response to movement of the tamper arm 302 to a position abutting a paper sheet, switch 320 is repeatedly actuated. Switch logic means, such as conventional counter registers are provided in reproduction controller 94 to sense the number of actuations of switch 320 as the tamper assembly 300 is moved away from the tray by the size of paper placed therein, and thereby instruct reproduction controller 94 as to the width of paper in the tray. Reproduction controller 94 reports paper size in the duplex tray 22 at display 31. When tamper arm 302 moves to the "no paper" position, sector member 310 is provided with a bump 322 which actuates switch 320 to a constant ON position. Since the tamper arm is no longer moving, the ON condition is constant so long as no paper is deposited in tray 22. Reproduction controller 94 is advised of this condition, and will report a NO PAPER condition at display 31.

It will be appreciated that the bump/switch actuating system is only one embodiment usable in the present invention. Other arrangements are conceivable wherein distinguishable areas are provided on the sector member for detection by a sensor member on movement thereby. It may also be appreciated that the tamper member may be provided in other arrangements to both tamp the copysheets against an abutment as well as sense the absence and size of paper. Accordingly, for example, the tamper member may be a spring biased member mounted for reciprocating movement transverse to the direction of paper travel through the duplex module.

In conjunction with the tamper/size sensing apparatus described, a pressure sensitive switch 324 may be provided on the tray 22 surface, and connected to the switching logic means. The purpose of pressure sensitive switch 324 is to distinguish generally between long and short length sizes of paper.

In practice, the bumps 318 and 322 are provided to actuate the switch between positions which would indicate that the tamper arm 302 is at a standard paper width position away from abutment 202, such as for example 11 inches (for $8\frac{1}{2}\times 11$ paper fed long edge first), $8\frac{1}{2}$ inches (for $8\frac{1}{2}\times 11$, 13 or 14 inch paper fed short edge first); and, of course, a position less than 8 inches indicative of the absence of paper. Accordingly, switch logic means will detect no actuations for 11.7 inch paper, one actuation when rotated away from 10.12 inch paper, two actuations when the tamper arm is rotated away from $8\frac{1}{2}$ paper and a constant actuation for no paper. Since there is no way to distinguish between $8\frac{1}{2}\times 11$ inch paper fed short edge first and $8\frac{1}{2}\times 13$ or 14 inch paper fed short edge first, the pressure sensitive switch 324 is placed in tray 22 at a position which will distinguish between them on actuation thereof. In combination with the switching means associated with the tamper means, the switching logic can distinguish between paper sizes having the same widths, and different lengths. It will be appreciated that because tamper arm 302 is normally biased toward the tray, when there is no paper in the tray, there will be a constant ON signal received from the tamper assembly. This is desirable since there will therefore be an instantaneous NO PAPER indication when this information is required, such as, for example, when the duplex operation requiring an empty tray are operator selected.

In accordance with another aspect of the invention, there is provided mounted on the duplex module frame 20 an improved friction retard copysheet feeder assembly for feeding copysheets from duplex tray 22 and auxiliary tray 28, to reproduction processor duplex entry path 158 in accordance with the desired copying options. As best seen in FIGS. 4 and 6, extending perpendicularly from the rear side 400 of frame 20, and extending forward over duplex tray 22 and auxiliary tray 24 is feeder toggle carriage 402. Feeder toggle carriage 402 is pivotally mounted on the rear frame portion 400 via carriage pivot shaft means 404. Feeder toggle carrier 402 is comprised generally of a gear box section 406 which holds transmission 408, driven by a drive gear (not shown) extending outwardly from reproduction processor A. Extending from gear box section 406, perpendicularly to carriage pivot shaft means 404, is a cam follower means 410. Cam follower means 410 is biased by toggle carriage cam 412 to neutral copysheet feeding positions as will be described thereby moving feeder toggle carriage 402 to appropriate positions.

Further, comprising feeder toggle carriage 402, and extending cantilevered forwardly across the duplex and auxiliary trays 22 and 24 from gear box section 406 are duplex tray feeder arm 414 and auxiliary tray feeder arm 416. Extending through duplex tray feeder arm is a duplex tray feed roller shaft 418 driven for rotational motion thereof by the drive gear from the reproduction processor via transmission 408 in gear box section 406. The opposite end of duplex tray feed roller shaft 418 is cantilevered over the duplex tray and supports a duplex tray feed roller 422 for rotational motion. The duplex tray feed roller 422 is driven for constant rotation, and will contact copysheets in to impart motion thereto when pivoted into copysheet feeding position. Auxiliary tray feeder arm 416 is comprised of generally the same elements including auxiliary tray feed roller shaft 424, supporting for constant rotational motion auxiliary tray feed roller 426. It will be appreciated that while the feed roller is shown here as a preferred embodiment, any friction feeding arrangement, mountable for copysheet engagement at one end of the feeder arms would find suitable use. Thus for example, a paddle feeder arrangement or multi roller feeder are suitable for use in conjunction with the described arrangement.

Toggle carriage cam 412 biases feeder toggle carriage 402 in pivoting motion between positions required for feeding and non-feeding positions. Since it is desirable to avoid the cost of a clutch in low cost copiers, feed rollers 422, 426 are in constant motion, and must be moved to a neutral position when copysheet feeding is not desired. Accordingly, for feeding from duplex tray 22, toggle carriage cam 412 rotates to bias feeder toggle carriage 402 via cam follower means 410 downwardly to provide feeder arm 414 in lowered position and supporting feed roller 422 immediately above copysheets in duplex tray 22. When it is desired that copysheets be fed from duplex tray 22, the toggle carriage cam 412 biases feeder toggle carriage 402 to a copysheet feeding position to bring feed roller 422 downwardly contacting with a copysheet to feed such sheet from the stack and advance the sheet between roller 422 and surface **206*a*. For feeding from auxiliary tray 24, toggle carriage cam 412 biases feeder toggle carriage 402 via cam follower means 410 upwardly to rotate toggle carriage 402 to provide auxiliary tray feeder arm 416 supporting feed roller 426 in position immediately above auxiliary tray 24. When feeding from auxiliary tray 24 is desired, the toggle carriage cam 412 biases feeder toggle carriage 402 to a copysheet feeding position to bring feed roller 426 downwardly contacting with a copysheet to feed such sheet from the auxiliary paper stack in auxiliary paper tray 24 and between roller 426 and surface 206*b*. When the toggle carriage 402 is pivoted to bring rollers 422, 426** out of engagement with the copysheet stacks, a gap is created therebetween to negate the possibility of inadvertent paper feeding.

FIG. 4A schematically illustrates the movement of the rollers from a neutral starting position, to a position above the rays and to a copysheet feeding position.

In combination with feed rollers 422 and 426, surfaces **206*a* and 206*b* are provided with retard pads 430 and 432 respectively to aid in the separation of copysheets from a stack during feeding operation from either tray. In accordance with the invention, retard pad 430 is mounted on a retard spring member 434 to be biased through retard opening 436. Retard spring member 434 is mounted at its other end on duplex module surface 204. In operation, retard pad 430 is biased for firm engagement with feed rollers 422** to whereby its operating characteristic of prevention of multiple feeding of copysheets is enhanced.

Feeder toggle carriage 402 is spring biased for rotational movement towards auxiliary tray 24 by spring member 438, which is connected at a first end on interior of the duplex module rear surface 20 on the duplex tray side of feeder toggle carriage 402, and at a second end on feeder toggle carriage 402 on the auxiliary tray side thereof. Spring member 438 is arranged to provide a downward biasing force on feeder toggle carriage 402 and auxiliary tray feeder roller 426. This downward biasing force provides feed roller 436 in firm engagement with retard pads 432. in the same manner as provided for the combination of feed rollers 422 and retard pad 430 and retard pad spring 434.

In combination with the downward pivoting motion of feeder arms 414, 416, duplex and auxiliary trays 22,24 are mounted on springs members 220 and 440 for upward biasing to bring copysheets stacked therein into position for copysheet feeding thereof. To this end, duplex elevator 219 and auxiliary trays elevator 441 are mounted to be upwardly biased to bring the ends of the elevators 219 and 441 adjacent abutment 206 into position for copysheet feeding. To counter the natural tendency of the spring biased trays to follow the feed rollers when feed rollers 422 and 426 are moved out of copysheet feeding positions with respect to the trays, means are provided to maintain the trays in the positions obtained when the rollers 422 and 426 are pivoted out of position. Ratchet member 444 is mounted for pivoting movement and normally biased through an opening 448 in abutment 206 for engagement with tab means 452 mounted on an adjacent portion of auxiliary tray elevator 24. Ratchet member 446 is mounted on ratchet lever member 448 whereby movement of toggle carriage 402 into either copy feeding position biases the ratchet lever member of the ratchet member to disengage with the tray tab member engaged thereto. Accordingly, the spring bias associated with the tray forces the tray upwardly to provide the copysheets in engagement relationship with the feeder rollers. Since the feeder rollers 422 and 426 are constantly rotating feeding begins immediately and, the rollers must be removed from copysheet engagement between feeding cycles. When a copysheet reaches duplex module exit nip 158 the engaged feeder arm is lifted out of engagement with the paper. When the feeder arms are pivoted out of position, the ratchets are engaged to prevent the spring biased trays from following the arm motion. Thus, while the feeder rollers still rotate, feeding of sheets is halted until the next sheet is to be fed.

In accordance with yet another aspect of the invention, means are provided to instruct the reproduction controller 94 as to the number of documents to be copied for correct simplex/duplex copying control. In accordance with the invention, automatic document feeder E is provided with document counting means, as shown best in FIG. 2, to count documents passing across platen 88 as for normal copying. Documents are fed from an input side 92 to an output side 94. Known document counting means may be provided along the document path between input 92 and output 93 such as photoelectric detector 500 which provides an electrical indication of documents passing thereby to reproduction controller 94. When an operator indicates a desire to perform simplex document to duplex copysheet copying by selecting the feature at display 31, reproduction controller 94 queries the operator via an alphanumeric display at display 31 whether the operator has information regarding the number of documents. If so, the operator is instructed to enter the number of original documents into the display. If the operator does not know the number of documents, and does not wish to count the documents to be copied, the operator is instructed to insert the documents into document feeder input 92 and press a START PRINT control. In response to this sequence, reproduction controller 94 disables reproduction processor A, and documents pass through to the output side 93 of automatic document feeder E without copying. The number of documents fed through document feeder E is thereby acquired by reproduction controller 94 for use in duplex copying. The operator is then instructed by the alphanumeric display to return the documents to the input side 92 of the document feeder E for copying. If the information acquired in the count indicates an odd number of simplex documents to be copied, the reproduction controller will disable the duplex copying functions in the reproduction processor and allow the last copysheet (which corresponds to the first document fed from the document handler) to receive a first side image copied thereon to pass through the processor without receiving a second side image. By allowing the operator to have the choice of providing the input information to the controller 94, significant processing time savings can be made and operator errors prevented to insure properly collated copy sets.

Trayless path 154 is defined by upper and lower baffles 501 and 502 extending generally from duplex module entry nip. 150 and duplex module deflector 152 to duplex module exit nip 156. An entry 504 and exit 506 are defined by baffles 501 and 502 at either end thereof to provide for entry and exit into trayless path 154. Supported on the upper baffle 501 are baffle nip rollers 510, while complementary nip forming rollers 512 are mounted on lower baffle 502. Baffle members 501 and 502 are supported and extend perpendicularly outwardly from the drive housing 514 of frame 20. As shown in FIG. 7, lower baffle 502 is supported for downward pivoting movement away from upper baffle member 501. Extending outwardly from lower baffle member 502 is baffle spring member 516. Baffle spring member 516 extends from lower baffle member 502 to impinge on interior drawer abutment 518, which is formed on the interior of front side 30 of drawer C, and may be advantageously provided above paper abutment 202. In practice, when drawer C is opened, the biasing force on spring member 516 is release, and baffle member 502 drops away from its position with respect to baffle member 501. Thus, with the drawer open, the lower baffle member 502 is in a lowered position enabling operator access to the trayless path 154 for jam clearance without releasing levers or the like. Thus it can be seen that the inner drawer front surface forms a cam surface with abutment 518 which coacts with baffle spring member 516 to close the tray less path baffle member 502.

Of particular importance to the present invention is the process of controlling the selection of the duplex paths. It is desirable to use the trayless path 154 as often as possible; and accordingly rather than simply selecting either trayless path 154 or duplex tray 22, each is used to its advantage, and both paths may be used in any single job run. The following table illustrates the selection of paper paths for various exemplary copying jobs:

TABLE 1

| Paper Size | Simplex/ Duplex RL ≧ 2 | Simplex/ Duplex RL > 2 | Duplex/ Duplex RL ≧ 2 | Duplex/ Duplex RL > 2 |
|---|---|---|---|---|
| A5 | Trayless | Trayless | Trayless | trayless |
| A4 or letter size LEF | Trayless | Trayless | Trayless | Stacked except last 2 copies run trayless |
| A4 or letter size SEF | Trayless | Stacked except last 2 copies run trayless | Trayless | Stacked except last 2 copies run trayless |
| B4 or Legal | Trayless | Stacked except last 2 copies run trayless | Trayless | Stacked except last 2 copies run trayless |
| A3 or | Trayless | N/A | N/A | N/A |

TABLE 1-continued

| Paper Size | Simplex/ Duplex RL ≧ 2 | Simplex/ Duplex RL > 2 | Duplex/ Duplex RL ≧ 2 | Duplex/ Duplex RL > 2 |
|---|---|---|---|---|
| 11 × 17 inch | | | | |

In accordance with Table 1, it can be seen that the paths are selected on the basis of the total copies to be made. When the total number of copies to be made (RL or run length) is less than or equal to two, and duplex copying is required, the duplex path deflector cam is set to direct copysheets to trayless path 152 which returns the copies to receive second side copies directly. When the number of copies is more than two, the deflector directs the copies to be stacked in duplex tray 22. However, in accordance with the present invention, and the last two sheets copied are directed to the trayless path for immediate return to reproduction processor to receive second side images.

The table discloses three general sequences for copying. In a first sequence, duplex or long documents for which copying time is longer than short documents, with two or less copies to be made, are placed on platen 88 either singly by an operator or automatically by an automatic document feeder. The document is scanned for copying once, and the copysheet bearing the document image is reversed in exit nip 80 and directed to trayless path 154. If the run length is two, the document is scanned again and a second copy is directed in the same manner to the trayless path. The first copysheet is held in the reproduction process entry nips 156 pending a signal thereto from reproduction controller 94 indicating that the second document for second side copying is in place, or the document has been turned over, while the second copy is held in the reversible exit nip 80. On receipt of the signal that the second document is ready for copying, the first copy is advanced into reproduction processor A for copying.

In the second sequence, in the case where more than two copies are to be produced, copies are made; reversed at the exit nip 80; and on reaching duplex deflector 152 directed to duplex tray 22 for stacking. However, the last two copies of the first side are deflected directly to trayless path 154, as described for the first sequence, the document to be copied is then turned over or replaced. The first two copies of the new document are transferred to the back side of the two copysheets held in the trayless path 154 as described in the first sequence. Then, the duplex tray feeder assembly is engaged, and the remainder of the side one copies are fed from the duplex tray 22 and advanced into reproduction processor A to have side two images placed on their blank sides.

It will be appreciated that, as shown in the Table, the very largest or smallest sheets of copysheets may not be accommodatable in a duplex tray as the product is designed to fit accommodate the most desired sizes of paper; and therefore, such paper sizes will be subject to more limited run lengths or restrictions. It will be appreciated that such sizes could be easily accommodated by designing a larger duplex module to accommodate in accordance with the general principles herein defined.

In accordance with a third copying sequence copysheet sizes which are of a size too large or small for stacking in a duplex tray are held in trayless path 154 after passing from the exit nip. In accordance with this copying sequence, copysheets bearing first images are passed from the reproduction processor to the duplex module trayless path. There, the copysheets are held until a signal is received from the controller indicating that a second image has been presented for copying. At that time, copysheets are advanced into reproduction processor A to have side two images placed on their blank sides. It will no doubt be appreciated that this method of copying is also applicable to all other sizes of copysheets contemplated in the present invention.

It will be appreciated that the above copying sequences are equally applicable to image merging copying. The only distinction in the copysheet paths is that selector 110 blocks the path to reversible nip 80, whereby the same side of the copysheet is presented in reproduction processor A to receive a second image overlayed on the first.

In applications for which two-up placement of originals is desired, i.e. two simplex documents placed side by side on a platen for producing duplex copies therefrom, trayless path 154 in duplex module B finds particularly advantageous use. This procedure requires that documents to be copied be placed on platen 88, image side down, for copying. Scanning optics 49 is driven by servo motor 90. It is a feature of the present invention that scanning optics 49 is operated to scan only that portion of platen 88 holding the document desired to be on side one of the copysheet passes thereby. The portion of platen 88 scanned is determined by the document which is preselected for copying. Trayless loop 154 enhances the process of the simplex/duplex copying by enabling the fast return of the first side copies from reversible exit nip 80. In a preferred embodiment of the invention, the first document to be copied is scanned twice, i.e. that portion of platen 88 on which the first side document is placed is scanned by scanning optics 49 two times. This may be accomplished in a variety of ways, and in the preferred embodiment, servo motor 90 drives scanning optics 49 to an appropriate position to allow exposure of a first side of the document and commences scanning the document. Servo motor 90 then returns scanning optics 49 to the position where scanning of the document began. The document is scanned again. Two copies of the first document are produced, each having a first side copy. These copies are passed out from fuser station 78 to reversible exit nip 80 where the direction of the copysheets is reversed, and the copysheets are directed to the duplex module B and duplex module trayless path 154 by deflector baffle 152. On return of the documents to reproduction processor for refeeding, through reproduction processor entry path 158, the copysheets are oriented to receive images on a second side. During the period that the copysheets are traveling back to reproduction processor A, scanning optics 49 is moved to a position which will allow copying of the second document on platen 88. The document selected to be side two of the duplex copies is scanned by scanning optics 49, which is again enabled to copy the image presented by the side two document on platen 88 onto the second side of the first copysheet. The platen 88 is scanned a second time whereby the side two document image is placed onto the second side of the second copysheet. The sheets are then allowed to exit the processor through reversible exit nips 80 to output tray 82. The process is repeatable until a desired number of copies is obtained. The last copysheet potentially involves only a single exposure of each document on the platen if an odd number of copies is desired. In summary, each simplex document of the two placed on platen 88 is scanned twice successively before scanning the other document. Copies made after the first document is scanned are reversed and inverted through the duplex module B, and represented to reproduction module A to receive second sided copies. To produce the second side copies, the other document on the platen is scanned twice successively. Completed documents are directed to an output. It will no doubt be appreciated that the procedure is also applicable to image merging copying, the change in the process being that the copysheets are deflected from entering the reversing exit nips prior to passage through the duplex module.

FIG. 8 shows the operation of the cams which drive the preferred embodiment of the invention. The cams are arranged to work only in conjunction with necessary counterparts. In a preferred embodiment of the invention, the cams are driven by a single motor, which decreases the costs of duplex module manufacture.

The invention has been described with reference to a preferred embodiment. Obviously modifications will occur to others upon reading and understanding the specification taken together with the drawings. It will no doubt be particularly appreciated that the many elements comprising the paper handling aspects of the present invention have applications beyond the described embodiment. This embodiment is but one example, and various alternatives modifications, variations or improvements may be made by those skilled in the art from this teaching which are intended to be encompassed by the following claims:

What is claimed is:

1. A reproduction machine for copying documents and including a paper tray for storing paper and accommodating a predetermined number of paper sheet sizes, comprising:

a tray member, having a generally planar paper sheet receiving surface, and fixed abutment members on a first side edge of said surface, and a front edge, in the direction of paper sheet travel out from said tray member, and extending upwardly from said paper sheet receiving surface;

at least one disappearing paper guide member mounted for reciprocating movement through a slot in the paper sheet receiving surface and spaced a distance from said abutment member corresponding to the width of a selected paper sheet size, whereby said disappearing paper guide is biased to a position below said paper sheet receiving surface by a paper sheet received in said tray member and having a width larger than said selected paper sheet size.

2. In a paper tray for holding paper for use in a reproduction machine including at least front and rear fixed paper abutments, the improvement comprising paper side guides members for fixedly maintaining paper in a preselected position within said tray between said front and rear abutments until said paper is removed therefrom, and accommodating a plurality of paper sizes, said paper guides self-adjustable between paper sizes in response to the deposit of paper in said paper tray.

3. The improvement defined in claim 2 wherein said paper guides are vertically compliant and horizontally rigid.

* * * * *